C. L. GARDNER.
CROSS CONVEYER.
APPLICATION FILED MAR. 25, 1907.
931,054.
Patented Aug. 17, 1909.
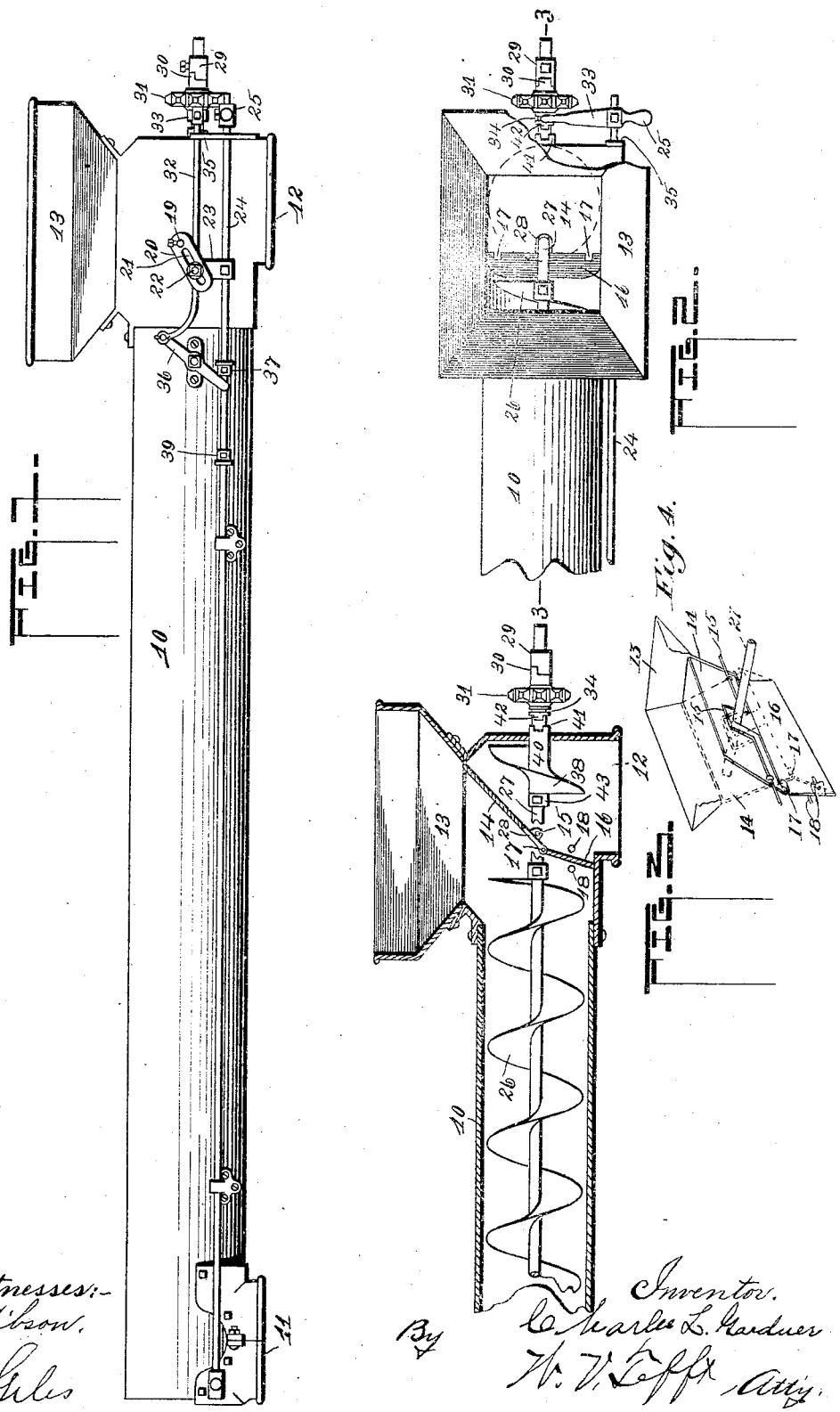
Witnesses:
H. V. Gibson.
E. M. Giles.
Inventor.
Charles L. Gardner
By H. V. Tefft Atty.

UNITED STATES PATENT OFFICE.

CHARLES L. GARDNER, OF PEORIA, ILLINOIS, ASSIGNOR TO GARDNER WEIGHER COMPANY, OF PEORIA, ILLINOIS, A CORPORATION OF ILLINOIS.

CROSS-CONVEYER.

No. 931,054.　　　Specification of Letters Patent.　　　Patented Aug. 17, 1909.

Application filed March 25, 1907. Serial No. 364,296.

*To all whom it may concern:*

Be it known that I, CHARLES L. GARDNER, a citizen of the United States, residing at Peoria, in the county of Peoria and State of Illinois, have invented certain new and useful Improvements in Cross - Conveyers; and I do hereby declare that the following is a full, clear, and exact description of the invention, which will enable others skilled in the art to which it appertains to make and use the same.

This invention has reference to cross conveyers such as are commonly used on threshing machines for delivering grain or other material alternately at either side of the machine.

The object of my invention is to provide a cross conveyer of simple construction and operation in which the auger operates only when conveying to the opposite end of the conveyer.

In the accompanying drawings, which illustrate my invention, Figure 1 is a side view of a conveyer embodying my improvements; Fig. 2 a top view of the receiving end thereof, a portion of the hopper being broken away to disclose the operating mechanism; and Fig. 3 a vertical longitudinal sectional view on the line 3—3 of Fig. 2, showing a portion of the conveyer body and shaft broken away. Fig. 4 is a detail view showing the manner of mounting a reciprocating valve and connected parts.

This conveyer consists of the tube 10 which is adapted to be mounted on the top of and extend from side to side of a threshing machine and has the outlet 11 at one end and the outlet 12 at the other end. At the end of the tube 10 above the outlet 12 is a hopper 13 which delivers to the conveyer, the opening in the bottom of the hopper being arranged partly over the opening 12.

The valve 14 is pivoted as at 15 to the side walls of the conveyer below the opening in the bottom of the hopper and swings alternately on said pivot 15 to bear against the edge of the hopper as shown in Figs. 2 and 3 and to bear against the opposite edge of the hopper. Pivoted to the lower end of the valve 14 as at 17 is the part 16 which is held in place by and moves loosely between the pins 18 on the side of the conveyer for stopping off the space below the valve 14.

The valve is provided with a shaft 19 at its pivotal axis which extends through the side of the conveyer and has the slotted lever 20 fixed thereon. The slot 21 of said lever is engaged by the pin 22 on the part 23 which is fixed on the rod 24, which said rod extends from end to end of the conveyer and is provided with the handles 25 thereon so that when the rod 24 is moved lengthwise the valve 14 is caused to move so as to deliver in the direction in which the rod is moved.

The auger 26 extends lengthwise of the conveyer tube 10 for conveying grain from the hopper inlet 13 to the outlet 11 and terminates as shown in Figs. 2 and 3 at the inner side of the valve 14. The auger stem 27, however, is passed through the slot 28 in the valve 14, projects through the end wall of the conveyer and has the clutch member 29 fixed thereon which is adapted to be engaged by the clutch lug 30 on the face of the sprocket wheel 31, said sprocket wheel being as usual connected to be constantly driven as grain is being delivered to the conveyer.

As is apparent, when the valve is in the position shown in Fig. 3, grain deposited in the hopper is delivered into the tube 10. At such time, it will be necessary to operate the auger to convey the grain to the outlet 11 and for the purpose of shifting the sprocket 31 into engagement with the clutch member 29 at such time for the purpose of operating the auger, the rod 32 is provided which has the usual forked arm 33, the fork of which engages the annular groove 34 in the sleeve portion at the side of the sprocket. This rod 32 passes through a bearing plate 35, and is pivotally connected at its opposite end to the lever 36 which is pivoted at its center to the tube 10. The lower end of the lever 36 is forked and straddles the rod 34 and is arranged to be so engaged by the collar 37 thereon that when the rod 24 is shifted to the position shown in the drawings, the sprocket 31 will be shifted by means of the arm 33, rod 32 and lever 36 into engagement with the clutch 29. When the rod 24 is shifted in the opposite direction and the valve 14 thrown into position against the opposite lower edge of the hopper, the collar 37 moves away from the lower edge of the lever 36 and the collar 39 moves into engagement therewith and shifts the sprocket 31 out of engagement with the clutch member 29.

When handling wet grain, it may be necessary to provide means for forcing the grain through the opening 12 and it is desirable to operate such means when required, without operating the auger 26. This may be effected by providing the flight 38 on the sleeve or collar 43 which fits loosely upon the auger shaft 27 between the valve 14 and the end of the auger and has the sleeve portion 40 extended outside the end of the conveyer and provided with clutch lugs 41 thereon adapted to be engaged by corresponding clutch lugs 42 which may be provided on the inner face of the sprocket. This flight is inclined in the opposite direction to the auger 26 and is held against inward movement on the shaft by the collar 43 which is fixed on the shaft.

The operation with the flight 38 is the same as that hereinbefore described without the flight except that when the rod 24 is shifted to the right, the sprocket 31 is moved so that the clutch lugs 42 thereon engage the clutch lugs 41 on the end of the sleeve 40 whereby the flight 38 is caused to operate independent of the auger.

What I claim is:

1. In a cross conveyer, the combination of a conveyer tube having an outlet at each end thereof, an inlet to said tube, a rotary auger in the conveyer tube having the stem thereof projecting beyond the end of the conveyer tube, clutch engaging means on the auger shaft exterior of the conveyer tube, one part loose on the shaft and the other fixed, a swinging valve adapted to alternately open and close the outlet at the inlet end of the conveyer, means operable from either end of the conveyer connected with said valve and the movable clutch part on the auger stem for actuating the valve and shifting clutch part simultaneously.

2. In a cross conveyer, the combination with a conveyer tube having an inlet at one end and an outlet at each end thereof, of a valve comprising a horizontal pivoted part movable alternately to deliver grain from the inlet to the outlet at the same end of the tube and to deliver from the inlet to the tube proper, and a lower part pivoted to the lower end of said upper part.

3. In a cross conveyer, the combination with a conveyer tube having an inlet at one end and an outlet at each end thereof, of a valve at the inlet end of the conveyer comprising a horizontal pivoted upper part movable alternately to deliver from the inlet to the outlet at the same end of the tube and to deliver from the inlet to the tube proper, a lower part pivoted at the lower end of the said upper part and means for limiting the swing of the said lower part.

4. In a cross conveyer, the combination of a conveyer tube having an outlet at each end thereof, an inlet to said tube a right hand auger in the tube at one side of the inlet opening a left hand auger in the tube at the other side of the inlet opening and a swinging valve intermediate of the right and left hand auger adapted to alternately deliver material from the inlet opening to said right and left hand auger.

5. In a cross conveyer, the combination of a conveyer tube having an outlet at each end, a hopper inlet opening to said conveyer tube, a horizontally pivoted valve movable alternately to deliver material from the inlet opening into the tube at opposite sides of the said inlet opening and an auger stem in the tube extending at each side of the said valve, said auger stem being provided with a left hand flight at one side of the valve and a right hand flight at the other side of the valve.

6. In a cross conveyer, the combination of a conveyer tube provided with an outlet at each end, an inlet to said tube an auger stem extending through said tube provided with a conveying flight fixed thereon at one side of the inlet opening and an oppositely disposed auger flight loosely mounted thereon at the other side of the inlet opening, a swinging valve intermediate of the fixed and loosely mounted flight adapted to alternately deliver from the inlet opening to the fixed and loosely mounted flight, auger actuating mechanism and means for simultaneously shifting the valve to deliver to the fixed flight and to shift the auger drive mechanism to stop the loosely mounted flight and start the fixed flight and for simultaneously shifting the valve to deliver to the loosely mounted flight and shifting the auger actuating mechanism to stop the fixed flight and start the loosely mounted flight.

7. In a cross conveyer, the combination of a conveyer tube having an outlet at each end and having an inlet thereto, a horizontally pivoted valve adapted to alternately deliver material from the inlet into the tube at opposite sides of the inlet, an auger in said tube at one side of the inlet having the stem thereof extending on the other side of the valve beyond the end of the conveyer, an auger flight loosely mounted on the auger stem on the opposite side of the said valve from the said auger, said auger flight having a clutch part projecting beyond the end of the conveyer, a clutch member fixed on the projecting auger stem, a constantly driven clutch member intermediate of the fixed clutch member and the projecting clutch part of the auger flight and means for simultaneously moving the valve to deliver material from the inlet to the said auger and for shifting the said constantly driven clutch member from engagement with the clutch part of the auger flight into engagement with the fixed clutch member and for simultaneously moving the valve to deliver material from the inlet opening to the said loosely mounted auger flight and for shifting the constantly driven clutch member from engagement with the fixed clutch member on the auger stem into engagement with the projecting clutch part on the said auger flight.

8. In a cross conveyer, the combination of a conveyer tube having an inlet at one end and an outlet at each end, a horizontally pivoted valve movable alternately to open and close the outlet at the inlet end of the conveyer, an auger in the conveyer tube having the stem thereof extending on the opposite side of the valve and projecting through the end of the conveyer, means loosely mounted on the auger stem at the opposite side of the valve from the said auger for forcing material through the outlet at the inlet end of the conveyer, said means being provided with a clutch part projecting beyond the end of the conveyer, a clutch member fixed on the projecting auger stem, a constantly driven clutch member intermediate of said clutch part and the fixed clutch member, and means for simultaneously moving the valve to open the outlet and moving the constantly driven clutch member from engagement with the fixed clutch member into engagement with the said clutch part and for simultaneously moving the valve to close the outlet and shifting the constantly driven clutch member from engagement with the said clutch part and into engagement with the fixed clutch member.

In testimony whereof I have affixed my signature, in presence of two witnesses.

CHARLES L. GARDNER.

Witnesses:
E. M. GILES,
MARY E. COMEGYS.